United States Patent [19]

Ciarniello et al.

[11] 4,137,557

[45] Jan. 30, 1979

[54] AUTOMATIC CUT-OUT DEVICE

[75] Inventors: Giorgio Ciarniello, Vasto; Oscar De Lena, Termoli, both of Italy

[73] Assignee: Societa Italiana Vetro S/V S.p.A., Vasto (Chieti), Italy

[21] Appl. No.: 877,380

[22] Filed: Feb. 13, 1978

Related U.S. Application Data

[63] Continuation-in-part of Ser. No. 577,563, May 14, 1975, Pat. No. 4,088,940.

[30] Foreign Application Priority Data

May 15, 1974 [IT] Italy .................... 51009 A/74
Feb. 12, 1975 [IT] Italy .................... 48126 A/75

[51] Int. Cl.² .......................................... H02H 3/24
[52] U.S. Cl. .......................... 361/92; 361/187; 307/10 BP
[58] Field of Search ............... 361/86, 90, 92, 187; 307/10 BP, 130, 362, 363; 340/661, 663; 320/39, 40, 43, 54

[56] References Cited

U.S. PATENT DOCUMENTS

| | | | |
|---|---|---|---|
| 3,046,455 | 7/1962 | Nelson et al. | 361/187 |
| 3,522,481 | 8/1970 | Terzic | 320/40 X |
| 3,532,968 | 10/1970 | Overlie | 340/661 X |
| 3,656,045 | 4/1972 | Frezzolini et al. | 361/92 X |
| 3,911,360 | 10/1975 | Kimzey | 340/661 X |

Primary Examiner—Harry E. Moose, Jr.
Attorney, Agent, or Firm—Browdy and Neimark

[57] ABSTRACT

A device for cutting out non-essential loads in a generator and battery-fed electric plant includes a voltage detecting unit connected across the terminals of the battery. The detecting unit may be a relay. Whenever the voltage at the terminals falls below a predetermined level, the detecting unit effects the disconnection of the non-essential load or loads from the terminals of the battery and generator, while allowing the essential load or loads. The detecting unit preferably includes a differential amplifier having one of its inputs connected to a voltage divider connected in parallel with the battery and its second input coupled to a source of reference potential.

7 Claims, 7 Drawing Figures

AUTOMATIC CUT-OUT DEVICE

REFERENCE TO RELATED APPLICATION

This application is a continuation-in-part of application Ser. No. 577,563 of Ciarniello et al. filed May 14, 1975 and entitled An Automatic Cut-Out Device, the entirety of which is incorporated herein by reference; the application has matured as U.S. Pat. No. 4,088,940 on May 9, 1978.

BACKGROUND OF THE INVENTION

The invention refers to a device which automatically cuts out non-essential loads in a generator and storage-battery fed electric circuit when the overall load on the circuit absorbs more power than the power fed by the generator to the battery, in order to prevent the battery charge from sinking below a critical level, i.e. the level below which the battery would become irremediably damaged.

The invention has its main field of application in motor vehicles, to whose electric circuits there are applied additional, non-essential fixtures such as air conditioners, electrically heated windows, a refrigerator etc.

The power plant of modern motor craft is designed to handle under normal operating conditions such additional loads without letting the charge of the storage battery sink below this critical level. However, conditions may occur in which, because of the simultaneous insertion of too many loads into the circuit or because of a reduction in the generator output, the electric power absorbed from the storage battery may exceed the power supplied to it by the generator and consequently its charge may sink to a level where the battery is irreparably damaged.

It is true that the electric plant of today's motor vehicles is provided with a warning lamp which lights up when the generator delivers to the storage battery no power or insufficient power because it stands still, is defective or runs at low speed, thereby signalling to reduce the loads on the electric plant of the vehicle. But there occur also conditions, in which the generator, although operating at full capacity, is still unable to deliver to the battery all the power absorbed therefrom by the loads. In this case, the warning lamp gives no warning, even after the battery has been discharged beyond the critical level, beneath which it becomes irreparably damaged.

The invention provides a device which automatically switches the non-essential loads off the electric circuit of a motor vehicle in those conditions in which the power absorption of the circuit exceeds the available power supply from the generator and switches them on again when these conditions cease.

BRIEF DESCRIPTION OF THE DRAWINGS

For a purely illustrative and in no way limitative purpose, the invention is described with reference to the attached drawings, wherein.

DETAILED DESCRIPTION OF THE PREFERRED EMBODIMENTS

Figure 1:
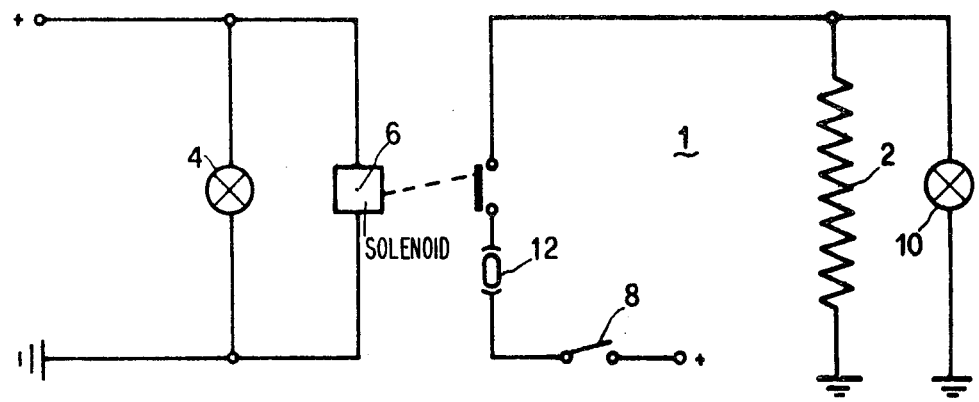
FIG. 1 shows a first embodiment of a generator and battery fed electric plant.

The embodiment shown in FIG. 1 is extremely simple and easy to install in existing motor vehicle circuits. In it, the circuit 1 of the non-essential or optional loads, as symbolized by a resistor 2, is controlled by the circuit of the usual warning lamp 4, which lamp lights up when the generator produces no current or runs at a slow speed. The solenoid 6 of a relay is connected in parallel with lamp 4. The current supply generator lighting the lamp 4 also energizes the relay to open the circuit 1. A switch 8 for the manual control of circuit 1, an indicator lamp 10 signalling when said circuit is in operation, and a fuse 12 may complete the circuit 1.

However, when there occur the last mentioned conditions for instance during night driving, in which, although the generator runs at full speed, the total load on the electric plant of the vehicle, i.e. the sum of the essential plus the optional loads, absorbs more power than the generator can deliver. In such cases no current will flow through the warning lamp 4 nor through the solenoid 6 to switch off the circuit 1 of the optional loads, with the result that the power absorption by the optional loads would cause the battery charge to sink below its critical level.

Figure 2:
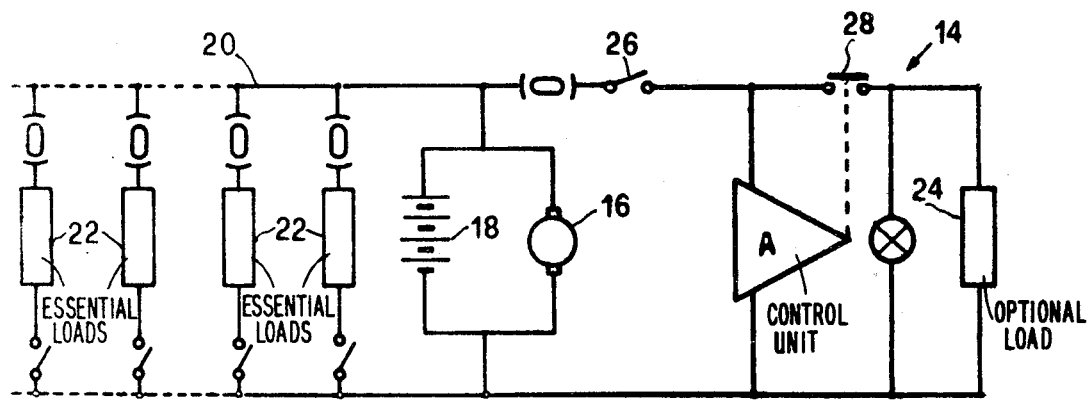
FIG. 2 shows a second embodiment of a generator and battery fed plant incorporating a voltage responsive circuit arranged to effect disconnection of non-essential loads via relay contacts.

The circuitry 14 shown in FIG. 2 obviates this drawback. In addition to this circuit, FIG. 2 shows schematically the generator 16, the storage battery 18 and the known circuit 20, in which the essential loads 22 are inserted through switches and fuses. The circuitry 14 which includes additionally one or more optional loads 24, is closed, when desired, by a manual switch 26. A transistorized control unit A, which will be discussed in greater detail with reference to FIGS. 3 and 7, opens relay contacts 28 of the circuit 14 when the charge of the storage battery 18 passes below the already mentioned critical level and closes them again once the charge rises again beyond it.

Figure 3:
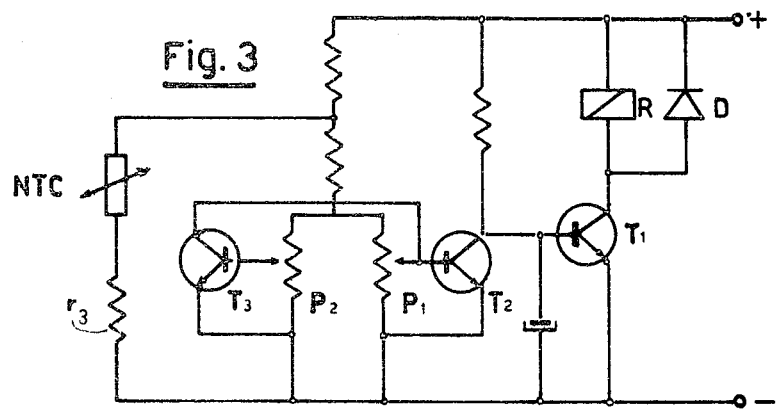
FIG. 3 shows a control circuit suitable for use in the circuit of FIG. 2.
Figure 5:
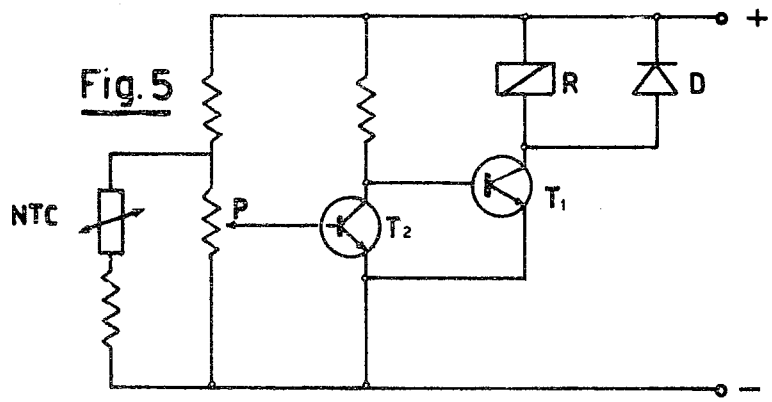
FIG. 5 shows another control circuit suitable for use in the circuit of FIG. 2.
Figure 7:
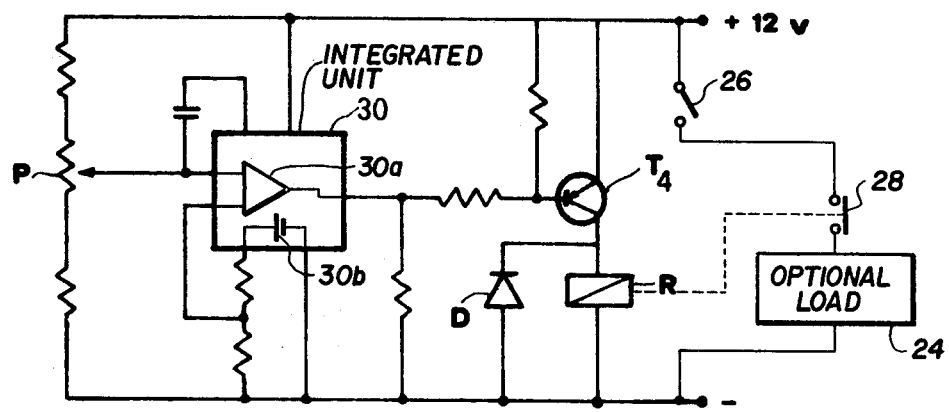
FIG. 7 shows a third possible control circuit for the circuit of FIG. 2 in accordance with the present invention.

Three convenient forms of control unit A (FIG. 2) are shown in FIGS. 3, 5 and 7.

The circuit of the control unit shown in FIG. 3 has an ON state and an OFF state and furthermore the voltage levels to which the passage from the ON to the OFF state corresponds are adjustable by two potentiometers $P_1$ and $P_2$, and therefore the interval in which the OFF state subsists may be adjusted according to requirements.

Figure 4:
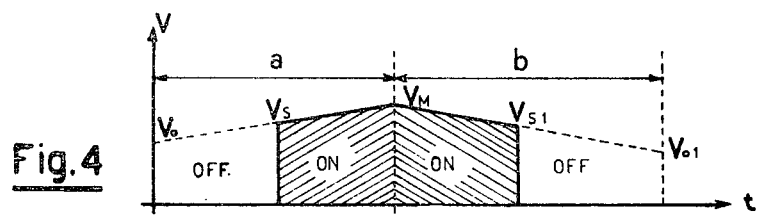
FIG. 4 shows a diagram illustrating the operation of the control circuit of FIG. 3.

FIG. 4 shows a time vs voltage diagram. The circuit of FIG. 3 is in the ON state above a $V_s$ or $V_{s_1}$ voltage level respectively during the battery charge period a or the battery discharge period b, and is in the OFF state for voltage values lower than these voltage levels. Therefore the optional loads will be inserted into the circuit only when the net voltage lies above said threshold voltages $V_s$ and $V_{s_1}$. As stated, these threshold voltages are adjustable by the potentiometers $P_1$ and $P_2$.

It is known that a storage battery (such as a lead battery) has during the charging phase, from 2.2 V/cell to 2.6 V/cell, while during the discharge stage its voltage output is from 2.2 V/cell to 1.8 V/cell and for lower values the battery is in a substantially discharged state and, if in this state more power is absorbed from it, its cells become irreversibly damaged.

So, for instance, the circuit of FIG. 3 may control the insertion of optional load or loads only at a predetermined level, for instance from 13.2 to 15.6 V for a 12 V lead battery, while for voltages below 13.2 V the optional loads are excluded.

The unit circuit shown in FIG. 3 further permits two threshold values for each charging period and each discharging stage in order to utilize a change of state of the final relay R each time these threshold values are exceeded. Therefore, by using the contacts 28 of the relay R, by the change of state of the relay one may control the switching-in and switcing-off of the optional loads, and, below the lower threshold values Vo and $Vo_1$, one may obtain, by the installation of an optical or acoustical device emitting a warning signal in the case of a discharge of the battery for unforeseen reasons (such as shortcircuits, loads fed but not controlled by the units), the result of realizing, in addition to an automatic safeguard, also a control which signals that the battery is being discharged.

In the circuit of FIG. 3, the variation of the feed voltage causes a variation of the base potential of the transistors $T_2$ and $T_3$ so as to carry them into conduction in relation to predetermined threshold levels established by the potentiometers $P_1$ and $P_2$ and by switching the power transistor $T_1$, which energizes the relay R.

Furthermore, the circuit is fitted with a safety device to safeguard it against thermal surges thanks to a thermistor NTC, while a diode D protects the transistor $T_1$, from the voltage surges caused by inductive loads.

A simplified version of the circuit of the control unit shown in FIG. 3 is illustrated in FIG. 5. Here a relay is utilized, which for corresponding voltage intervals is in states which are opposite to those illustrated in FIGS. 3 and 4, although it performs the same functions described with reference to FIGS. 3 and 4.

Figure 6:
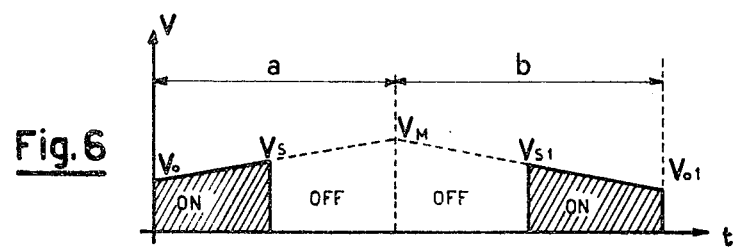
FIG. 6 shows a diagram illustrating the operation of the control circuit of FIG. 5.

This version presents the advantage of using a smaller number of components and of dissipating less energy, inasmuch as the relay R, in its normal operating condition, is for the greater part of the time, fed at voltages which are higher than the threshold voltages, that is in the OFF zone, as illustrated in FIG. 6. In FIG. 5 the components of the circuit are indicated with reference signs similar to those used for the circuit of FIG. 3.

Therefore, with reference to FIG. 6, the non-essential or optional loads are inserted in the range Vs-VM and VM-Vs$_1$ (for instance between 13.5 and 15.6 Volt), while in the range Vo-Vs and Vo$_1$ and Vs$_1$ only the essential loads are inserted (for instance between 11.8 and 13.5 Volt).

The circuit illustrated in FIG. 5 performs the control of the voltage by determining the change of state of the final relay R each time the applied voltage exceed the threshold voltage Vs, which can be pre-established by the potentiometer P, while the voltage Vs$_1$, is the threshold voltage in the discharge phase, corresponding to the voltage Vs during the charging stage.

The circuit has been constructed in such a manner that for applied voltages below Vs the base current of the transistor $T_1$ is sufficient to keep it in the conduction phase (ON). When the threshold voltage Vs is reached, the transistor $T_1$ blocks, since the base current is short-circuited by the transistor $T_2$. A thermistor NTC and a resistor series connected with the thermistor provide for the compensation of thermal surges; the diode D protects the transistor $T_1$ during the voltage surges due to inductive loads.

Therefore the essential purpose of the two units shown in FIGS. 3 and 5 is that of permitting the switching in of the optional loads only when the battery has reached a predetermined level of charge, thereby safeguarding the state of the battery and improving the utilization of the generator, the battery and also improving the power balance of the plant.

In FIG. 7 an integrated unit 30 including a differential amplifier circuit 30a is inserted between the terminals of the battery. The circuit 30 also includes a reference voltage, shown schematically as a battery 30b. It is to be appreciated that in practice, the reference voltage source could in fact be a battery, a voltage regulated circuit or the like. For example, a reversely connected Zener diode could be positioned between the loads shown connected to the battery 30b, in place of the battery with one terminal also being connected to the 12V terminal of the battery. The threshold voltage of the battery, correspondingly to which the integrated unit turns a transistor $T_4$ on, is fed by a potentiometer P, consisting of three resistors connected in series across the terminals of the battery. The middle resistor is provided with a movable tap which is connected to a first input terminal of the amplifier circuit 30a. The second input terminal of the differencial amplifier is connected to a junction point between two resistors which are connected in series with one another across the reference voltage source, illustrated diagrammatically as the battery 30b. When the battery voltage reaches this threshold level, the current which passes through transistor $T_4$ will actuate a relay R which closes contacts 28 which insert, into the battery fed circuit, the circuit of the optional loads, one optional load 24 being shown in FIG. 7. Also this version may be equipped with a diode D connected across the relay R and which protects the power transistor $T_4$ from the current surges of the inductive loads.

In operation the differential amplifier 30a, produces an output signal only in particular conditions of the input signals. On the first input terminal of the amplifier 30a there is present a signal provided by the potentiometer P inserted into the voltage divider fed in parallel with the feed voltage of the vehicle. Only when this voltage exceeds the value pre-established by the second voltage divider connected across the reference voltage source 30b does an output of the differential amplifier 30a appear. This signal is capable of switching on the transistor $T_4$ which in turn actuates the relay R. When the relay R is energized and therefore the current available from the generator 16 exceeds the current abosrbed by the battery 18 (in order to prevent the optional loads from being fed from the battery instead of from the generator) the contacts 28 of relay R, which is series connected with the switch 26 of the optional loads permits the insertion of these loads.

As soon as the feed voltage of the vehicle sinks, the level of the voltage to the second input of the differential amplifier 30a becomes greater than that on its first input thereby blocking the differential amplifier 30a.

Consequently transistor $T_4$ is switched off and relay R reverts to its rest position, thereby reopening contacts 28. Under these conditions, even if the switch 26 for the optional loads has been left closed, these loads are cut off, since the contacts 28 have opened. This condition prevails until the battery 18 becomes sufficiently charged or load condition change so that the second input no longer exceeds that first input, then the optional load or loads 24 are again connected.

It is understood that the differential amplifier circuit 30a, with its associated reference voltage source 30b may be carried into practice in different manners according to the known technique. Furthermore, the integrated unit 30 may be dimensioned so as to permit the eliminating of the power transistor $T_4$, in effect portions of unit 30 acting as the transistor $T_4$.

It is clear that the exemplary embodiment illustrated in FIGS. 2, 7 is for a purely illustrative purpose and in no way limitative. Many variants and changes may be applied to them without departing from the scope of the present invention, its scope being defined in the appended claims.

It will be obvious to those skilled in the art that various changes may be made without departing from the scope of the invention and the invention is not to be considered limited to what is known in the drawings and described in the specification.

What is claimed is:

1. A device to cut out non-essential loads in a generator and battery fed electric plant including, in addition to a circuit of essential loads, also a circuit of at least one non-essential load, said device comprising a voltage responsive means connected across terminals of said battery for opening said circuit of at least one non-essential load whenever voltage at said terminals falls below a pre-set level, said voltage responsive means including an integrated unit having means for developing a constant reference voltage and a differential amplifier; a power transistor, said differential amplifier having its output controllably connected to said power transistor; and a normally closed contact relay coupled to said power transistor to be activated thereby whenever the output of said differential amplifier exceeds a pre-adjustable critical level, said output being proportional to the difference between the battery voltage and said constant reference voltage.

2. A device according to claim 1, wherein said differential amplifier has its first input connected to a tap on a voltage divider connected across said terminals of said battery.

3. A device according to claim 2, wherein said tap is adjustable.

4. A device according to claim 3, wherein said differential amplifier has its second input coupled to a source of said constant reference voltage.

5. A device according to claim 4, including a further voltage divider, said further voltage divider being connected across said source of said constant reference voltage and said second input is connected to a tap on said further voltage divider.

6. A device according to claim 5, wherein said tap on said further voltage divider is fixed.

7. A device according to claim 1, wherein said voltage responsive means is directly, conductively connected across said terminals of said battery free of series connected semiconductive members.

* * * * *